MAGNETIC DRAG TACHOMETER

Filed July 25, 1946 2 SHEETS—SHEET 1

INVENTOR.
John H. Andresen Jr.
BY
Myron J. Seibold
ATTORNEY

April 22, 1952 J. H. ANDRESEN, JR 2,593,646
MAGNETIC DRAG TACHOMETER
Filed July 25, 1946 2 SHEETS—SHEET 2

INVENTOR.
John H. Andresen Jr.
BY
Myron J. Seibold
ATTORNEY

Patented Apr. 22, 1952 2,593,646

UNITED STATES PATENT OFFICE 2,593,646

MAGNETIC DRAG TACHOMETER

John H. Andresen, Jr., Port Washington, N. Y., assignor, by mesne assignments, to Kollsman Instrument Corporation, Elmhurst, N. Y., a corporation of New York Application July 25, 1946, Serial No. 686,168

12 Claims. (Cl. 264—13)

This invention relates to a magnetic drag tachometer for measuring rotative speeds and has for its object the provision of such tachometer where the relative movement between the magnetic field and the drag element has a substantial radial directional component to dampen movement of the drag element.

Another object of the invention is to provide a magnetic drag tachometer in which a drag disk presents a variable volume to the magnetic field to vary the response of the drag disk to change in rotative speed of the magnetic field.

Another object of the invention is the provision of a tachometer having a drag element with a pair of independently rotatable magnetic drag means cooperating therewith so that the movement of the drag element is determined by the algebraic sum of the rotative speeds of the magnetic drag means.

Other objects and features of the invention will be readily apparent to those skilled in the art from the specification and appended drawings illustrating certain preferred embodiments in which.

Figure 1:
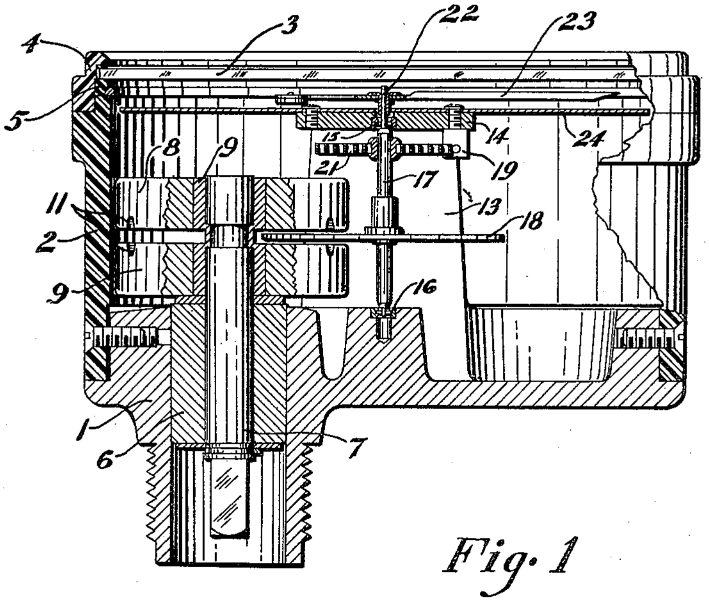
Figure 1 is a view partly in section and partly in elevation of a tachometer according to the present invention.
Figure 3:
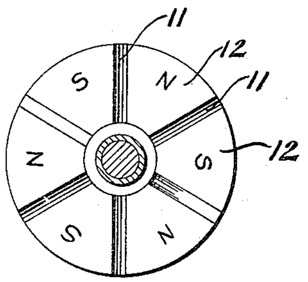
Figure 3 is a detailed sectional view on the line III—III of Figure 2 indicating the pole faces on each of the magentic disks of the magnetic drag means of the tachometers of Figures 1 and 2.

The tachometer shown in Figure 1 includes a supporting base 1 having attached thereto a cylindrical casing 2 closed by a glass 3 mounted on the casing 2 by a bezel 4 and sealed thereto by a gasket 5. In the base 1 is disposed a bearing 6 in which is rotatably mounted a shaft 7 carrying a pair of permanent magnet disks 8 and 9 rigidly mounted to the shaft by a cast bonding medium. Each of the magentic disks 8 and 9 have faces as indicated in plan in Figure 3 being supplied with notches 11 dividing the disk faces into a plurality of poles 12 which are magnetized so that adjacent poles are of opposite polarity. The magnetic disks 8 and 9 are mounted on the shaft 7 with poles of opposite polarity opposed to provide a strong magnetic field therebetween.

The base 1 is provided with a standard 13 carrying a supporting plate 14. In bearings 15 in plate 14 and 16 in the base 1 is pivotally mounted a shaft 17 upon which is rigidly supported a disk 18 of high conductivity material having a portion thereof projecting between the disks 8 and 9. Depending from the plate 14 is a support 19 to which and to the shaft 17 is mounted a hairspring 21 biasing the shaft 17 against rotation. The shaft 17 terminates in a staff 22 upon which is mounted a pointer 23 cooperating with a dial 24 mounted on the plate 14, the dial 24 bearing indicia of the quantity to be measured such as the rotative speed of the shaft 7.

Rotation of the shaft 7 and of the magnetic fields between the disks 8 and 9 results in a torque exerted on the disk 18 from the eddy currents induced therein. This torque is opposed by the bias of spring 21 and shaft 17 will have an angular rotation to equalize the drag torque and the spring bias. With the uniform disk of Figure 1, the rotation of the shaft 17 will be proportional to the speed of rotation of the shaft 7. Rotation of shaft 17 moves the pointer 23 relative to the indicia on dial 24 to indicate the rotative speed.

With the shafts 17 and 7 eccentrically mounted as shown, the relative movement between the magnetic field and the disk 18 will have a substantial radial directional component, the relative movement varying from substantially radial at the edge of the disk to substantially tangential at the inner penetration of the field. The radial directional component of relative movement does not effect the torque exerted on the disk 18 but does serve to dampen its movement to provide a steady position of the pointer 23 indicating the rotative speed. The tachometer of this invention thus secures the dampening effect from the rotating magnetic drag means itself without the necessity of additional elements such as stationary magnets cooperating with the drag element.

Figure 2:
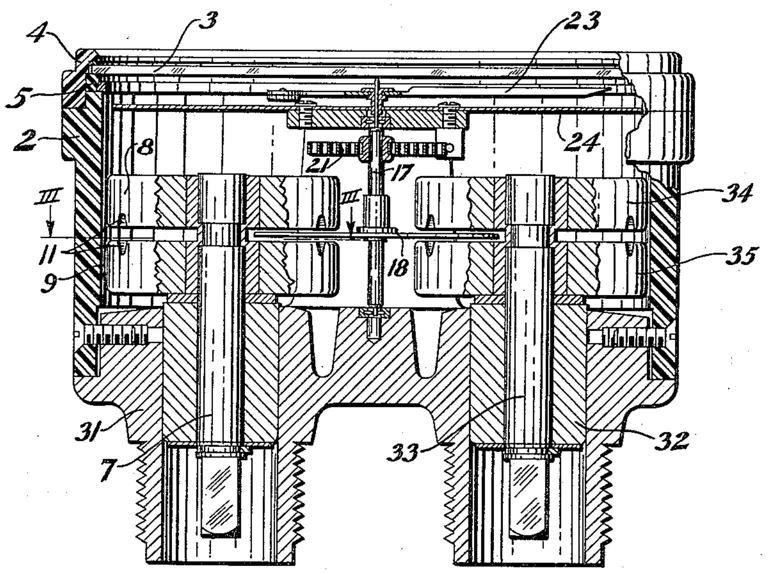
Figure 2 is a view similar to Figure 1 but showing the tachometer with two magnetic drag means.

In the tachometer of Figure 2, the elements so far described are present except that base 31 has been modified to receive a second rotating magnetic drag means. Parts the same as in Figure 1 have been given the same reference numerals. In the base 31 there is provided a second bearing 32 in which is rotatably mounted a shaft 33 carrying a pair of permanent magnet disks 34 and 35 identical with the disks 8 and 9 and disposed at the opposite side of the shaft 17 with the disk 18 similarly disposed between the pole pieces of the disks. Upon rotation of the shafts 7 and 33, two separate torques will be applied to the disk 18 by the eddy currents induced therein from the magnetic fields moving relative thereto. The resulting torque will be the algebraic sum of the individual torques and the movement of pointer 23 will be the algebraic sum of the rotative speeds of the shafts 7 and 33.

Figure 4:
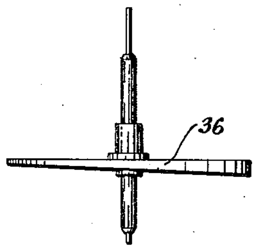
Figure 4 is a detailed horizontal view of a modified form of drag disk for the tachometer.
Figure 5:
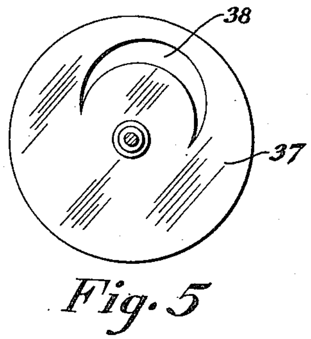
Figure 5 is a plan view of another form of drag disk for the tachometer.
Figure 6:
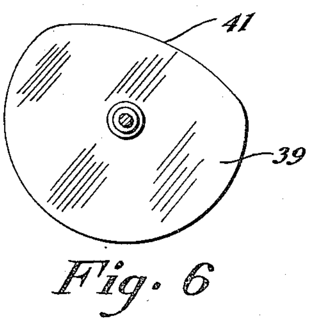
Figures 6 is a plan view of still another form of the drag disk for the tachometer.

With a uniform drag disk, the pointer movement will be proportional to the rotative speed of the driven shaft and will be in uniform increments for uniform changes of rotative speeds. Where a more sensitive pointer movement is desired at certain critical speeds, it is desired to render the scale on the dial 24 non-linear so as to expand it adjacent the critical value to secure greater pointer movement for a given change in rotative speed. The forms of drag disks illustrated in Figures 4, 5 and 6 provide means for expanding or contracting the tachometer scale at rotative speed as desired. In Figure 4 the drag disk 36 secures the non-linear movement and scale by variation in its thickness to vary the value of eddy currents set up in the disk and hence to vary the change in torque on the disk for a given change in rotative speed.

In Figure 5 the drag disk 37 is indicated with a crescent 38 which may be cut out or material added on to the disk to secure the desired movement.

In Figure 6 the disk 39 has a portion of its periphery cut away as at 41 to vary the area and volume of the disk cooperating with the rotating magnetic field. It will be obvious that the drag disk may assume any structural shape producing a desired scale arrangement and pointer movement.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a tachometer, a rotatable drag element of high conductivity material, means biasing said drag element against rotation, indicating means operated by said drag element, and magnetic drag means mounted for rotation about an axis parallel and eccentric to the axis of said drag element with the drag element disposed so as to have a major portion of its radial distance in the field of the magnetic drag means so that relative movement is produced between the magnetic field and the drag element upon rotation of said magnetic drag means with the relative movement having a substantial directional component radial of said drag element to dampen its movement.

2. In a tachometer, a disk of high conductivity material, a rotatable shaft upon which said disk is mounted, means biasing said shaft against rotation, indicating means operated by said shaft, a second shaft parallel to said first shaft and disposed adjacent the edge of said disk, and magnetic drag means mounted on said second shaft and disposed with relation to said disk to establish a magnetic field through a major portion of its radial distance, rotation of said second shaft producing relative movement between said magnetic field and disk having a substantial directional component radial of the disk.

3. In a tachometer, a disk of high conductivity material, a rotatable shaft on which said disk is mounted, means biasing said shaft against rotation, indicating means operated by said shaft, magnetic drag means including a plurality of opposed magnetic poles disposed at opposite sides of said disk to establish a magnetic field through a major portion of its radial distance, a shaft adapted to be driven at a speed to be measured and supporting said magnetic drag means, said shafts being substantially parallel and eccentrically mounted so that said magnetic poles pass the disk with a substantial radial directional component.

4. In a tachometer, a disk of high conductivity material, a rotatable shaft on which said disk is mounted, means biasing said shaft against rotation, indicating means operated by said shaft, a second shaft parallel to said first shaft and disposed adjacent the edge of said disk, magnetic drag means mounted on said second shaft and comprising a plurality of opposed magnetic poles rotating at opposite sides of said disk upon rotation of said second shaft and located to establish a magnetic field through a major portion of the radial distance of the disk, whereby movement of the disk is damped by the radial directional component of relative movement between the magnetic poles and the disk.

5. In a tachometer, a disk of high conductivity material, a rotatable shaft on which said disk is mounted, means biasing said shaft against rotation, indicating means operated by said shaft, a second shaft parallel to said first shaft and mounted beyond the edge of said disk, a pair of magnetic disks mounted on said second shaft so as to overlap a major portion of the radial distance of said disk at opposite sides thereof, said magnetic disks including a plurality of poles of opposite polarity establishing a magnetic field through said disk, and means for rotating said second shaft to induce a drag on said disk to effect operation of said indicating means to indicate the speed of rotation of said second shaft.

6. In a tachometer, a disk of high conductivity material, a rotatable shaft on which said disk is mounted, means biasing said shaft against rotation, indicating means operated by said shaft, a second shaft parallel to said first shaft and mounted beyond the edge of said disk, a pair of magnetic disks mounted on said second shaft so as to overlap a major portion of the radial distance of said disk at opposite sides thereof, said magnetic disks including a plurality of poles of opposite polarity establishing a magnetic field through said disk, and means for rotating said second shaft to induce a drag on said disk to effect operation of said indicating means to indicate the speed of rotation of said second shaft, the relative dimensions of said conducting and magnetic disks being such that the relative movement between the magnetic field and the disk has a substantial directional component radial of the disk.

7. In a tachometer, a disk of high conductivity material, a rotatable shaft on which said disk is mounted, means biasing said shaft against rotation, indicating means operated by said shaft, a second and third shaft parallel to said first shaft and disposed adjacent to the edge of said disk, magnetic drag means mounted on said second and third shafts and having magnetic fields passing through said disk, and means for independently rotating said second and third shafts whereby a resultant torque is produced on the disk corresponding to the algebraic sum of the rotative movements of said second and third shafts.

8. In a tachometer, a disk of high conductivity material, a rotatable shaft on which said disk is mounted, means biasing said shaft against rotation, indicating means operated by said shaft, second and third shafts parallel to said first shaft and disposed adjacent to the edge of said disk, magnetic drag means mounted on said second and third shafts and each comprising a plurality of opposed magnetic poles embracing said disk at opposite sides thereof, and means for independently rotating said second and third shafts to produce a resultant torque on said disk corresponding to the algebraic sum of the speeds of said second and third shafts.

9. In a tachometer, a disk of high conductivity material, a rotatable shaft upon which said disk is mounted, means biasing said shaft against rotation, indicating means operated by said shaft, a second shaft parallel to said first shaft and disposed adjacent to the edge of said disk, magnetic drag means mounted on said second shaft and disposed with relation to said disk to establish a magnetic field therethrough, rotation of said second shaft producing relative movement between said magnetic field and disk having a substantial directional component radial of the disk, said disk having a non-uniform contour to vary at different speeds of the magnetic drag means the incremental rotation of the disk in response to incremental change in speed of rotation of the drag means.

10. In a tachometer, a disk of high conductivity material, a rotatable shaft on which said disk is mounted, means biasing said shaft against rotation, indicating means operated by said shaft, magnetic drag means having a magnetic field passing through a portion only of the area of said disk, said area changing in location with movement of the disk, said disk having a non-uniform contour to vary at different speeds of said magnetic drag means the incremental movement of said disk in response to incremental change in speed of rotation of the drag means.

11. A tachometer as defined in claim 10 in which the disk has a variable thickness to produce the non-linear response.

12. In a tachometer, a disk of high conductivity material, a rotatable shaft on which said disk is mounted, means biasing said shaft against rotation, indicating means operated by said shaft, a second shaft parallel to said first shaft and disposed adjacent the edge of said disk, magnetic drag means mounted on said second shaft and comprising a plurality of opposed magnetic poles disposed at opposite sides of said disk, whereby movement of the disk is damped by the radial directional component of relative movement between the magnetic poles and the disk, said disk having a non-uniform contour to effect a non-linear movement of said indicating means whereby its rate of response may be increased over a desired range of speed of rotation of said second shaft.

JOHN H. ANDRESEN, Jr.

REFERENCES CITED

The following references are of record in the file of this patent:

UNITED STATES PATENTS

| Number | Name | Date |
|---|---|---|
| 1,309,390 | Young | July 8, 1919 |
| 1,989,547 | Clark | Jan. 29, 1935 |